US006891299B2

(12) United States Patent
Coupart et al.

(10) Patent No.: US 6,891,299 B2
(45) Date of Patent: May 10, 2005

(54) ROTARY ELECTRIC MACHINE HAVING A FLUX-CONCENTRATING ROTOR AND A STATOR WITH WINDINGS ON TEETH

(75) Inventors: Eric Coupart, Angouleme (FR); Pascal Gauthier, Asnieres-Sur-Nouere (FR); Jacques Saint-Michel, Vouharte (FR); Christophe Gilles, Angouleme (FR); André Eydelie, Saint Yrieix (FR); Laurent Jadeau, La Rochefoucauld (FR); Philippe Augier, Champniers (FR); Jean-Marie Guillot, Blanzaguet-Saint Cybard (FR)

(73) Assignee: Moteurs Leroy-Somer, Angouleme (FR)

(*) Notice: Subject to any disclaimer, the term of this patent is extended or adjusted under 35 U.S.C. 154(b) by 0 days.

(21) Appl. No.: 09/843,808

(22) Filed: Apr. 30, 2001

(65) Prior Publication Data

US 2002/0047425 A1 Apr. 25, 2002

(30) Foreign Application Priority Data

| May 3, 2000 | (FR) | ............................................. 00 05639 |
| Feb. 20, 2001 | (FR) | ............................................. 01 002263 |
| Apr. 17, 2001 | (EP) | ............................................. 01400981 |

(51) Int. Cl.$^7$ .................. H02K 37/00; H02K 21/12; H02K 21/00; H02K 23/04
(52) U.S. Cl. ..................... 310/156.55; 310/156.45; 310/156.43; 310/156.08; 310/152
(58) Field of Search ................. 310/156.55–156.61, 310/156.45, 156.43, 156.38, 156.01, 152, 40 R, 10

(56) References Cited

U.S. PATENT DOCUMENTS

| 871,758 | A | * | 11/1907 | Heitman et al. ............ 310/214 |
| 1,045,159 | A | * | 11/1912 | Lundell ....................... 310/224 |
| 1,375,699 | A | * | 4/1921 | Ilg .............................. 310/214 |
| 2,386,673 | A | * | 10/1945 | Fisher ......................... 310/214 |
| 2,719,931 | A | * | 10/1955 | Kober .................... 310/156.29 |

(Continued)

FOREIGN PATENT DOCUMENTS

| DE | 700 420 C | 11/1940 |
| DE | 195 03 610 A1 | 8/1996 |
| DE | 199 03 409 C1 | 7/2000 |
| EP | 0 143 693 A2 | 6/1985 |
| EP | 0 327 470 A1 | 8/1989 |

(Continued)

OTHER PUBLICATIONS

JR Hendershot, Design of Brushless Permanent Magnet Motors, 1994, Chapter 3, pp. 3.1–3.74.

U.S. Appl. No. 10/115,910, filed Apr. 2002, Gauthier et al.

U.S. Appl. No. 10/117,031, filed Apr. 2002, Gauthier et al.

U.S. Appl. No. 10/121,577, filed Apr. 2002, Coupart et al.

"Applications of NdFeB–magnets in Motors" by Dietmar Weinmann; Apr. 1991, No. 4; pp. 45–51.

*Primary Examiner*—Darren Schuberg
*Assistant Examiner*—Pedro J. Cuevas
(74) *Attorney, Agent, or Firm*—Oliff & Berridge, PLC

(57) ABSTRACT

A rotary electric machine including a flux-concentrating rotor with permanent magnets disposed between pole pieces, and a stator with teeth having a free end deprived of pole swellings and a concentrated winding. The pole pieces and the magnets are configured so as to minimize the difference $L_d - L_q$ where $L_d$ is inductance on a forward axis and $L_q$ is inductance on a quadrature axis.

45 Claims, 10 Drawing Sheets

U.S. PATENT DOCUMENTS

| | | | | |
|---|---|---|---|---|
| 3,072,813 A | * | 1/1963 | Reijnst et al. | 310/156.55 |
| 3,083,311 A | * | 3/1963 | Krasnow | 310/111 |
| 3,158,770 A | * | 11/1964 | Coggeshall et al. | 310/214 |
| 3,237,034 A | * | 2/1966 | Krasnow | 310/156.23 |
| 3,270,264 A | * | 8/1966 | Miner | 318/774 |
| 3,281,655 A | * | 10/1966 | Blasingame | 323/348 |
| 3,334,254 A | * | 8/1967 | Kober | 310/156.07 |
| 3,594,597 A | * | 7/1971 | Kildishev et al. | 310/214 |
| 3,671,788 A | * | 6/1972 | Knudson et al. | 310/156.22 |
| 3,701,405 A | * | 10/1972 | Fougere | 194/324 |
| 3,736,449 A | * | 5/1973 | Honeywell et al. | 310/171 |
| 3,760,208 A | * | 9/1973 | Hamon | 310/49 R |
| 3,806,744 A | * | 4/1974 | Abraham et al. | 310/49 R |
| 3,879,737 A | * | 4/1975 | Lunde | 347/55 |
| 3,889,140 A | * | 6/1975 | Baermann | 310/103 |
| 3,979,821 A | * | 9/1976 | Noodleman | 29/598 |
| RE29,090 E | * | 12/1976 | Fougere | 194/324 |
| 4,039,908 A | * | 8/1977 | Maeder | 318/701 |
| 4,072,315 A | * | 2/1978 | Tsujihara et al. | 369/266 |
| 4,080,724 A | | 3/1978 | Gillette | 29/598 |
| 4,117,360 A | * | 9/1978 | Richter | 310/183 |
| 4,160,926 A | * | 7/1979 | Cope et al. | 310/215 |
| 4,219,752 A | | 8/1980 | Katou | 310/156 |
| 4,243,903 A | * | 1/1981 | Mishima | 310/154.43 |
| 4,302,693 A | * | 11/1981 | Burgmeier et al. | 310/156.59 |
| 4,339,874 A | * | 7/1982 | Mc'Carty et al. | 29/598 |
| 4,355,785 A | | 10/1982 | Tosato et al. | 254/362 |
| 4,425,521 A | * | 1/1984 | Rosenberry et al. | 310/214 |
| 4,445,103 A | * | 4/1984 | Chass | 336/135 |
| 4,459,500 A | | 7/1984 | Miyamoto | 310/154 |
| 4,617,725 A | | 10/1986 | Holter et al. | 29/598 |
| 4,618,792 A | * | 10/1986 | Yates | 310/156.55 |
| 4,688,951 A | * | 8/1987 | Guers | 384/446 |
| 4,771,197 A | | 9/1988 | Ivanto et al. | 310/67 R |
| 4,774,424 A | * | 9/1988 | Habermann | 310/90.5 |
| 4,883,981 A | * | 11/1989 | Gerfast | 310/40 R |
| 4,896,839 A | * | 1/1990 | Curtis et al. | 242/7.02 |
| 5,013,953 A | | 5/1991 | Odell | 310/254 |
| 5,047,681 A | * | 9/1991 | Gaillard et al. | 310/156.55 |
| 5,066,880 A | * | 11/1991 | Banon | 310/156.55 |
| 5,091,668 A | * | 2/1992 | Cuenot et al. | 310/156.61 |
| 5,109,172 A | | 4/1992 | Pace | 310/154 |
| 5,162,686 A | * | 11/1992 | Royer | 310/156.59 |
| 5,177,391 A | | 1/1993 | Kusase | 310/263 |
| 5,214,839 A | | 6/1993 | Rieber et al. | 29/596 |
| 5,254,914 A | | 10/1993 | Dunfield et al. | 318/254 |
| 5,266,914 A | * | 11/1993 | Dickson et al. | 335/288 |
| 5,270,645 A | * | 12/1993 | Wheeler et al. | 324/207.12 |
| 5,327,069 A | * | 7/1994 | Radun et al. | 322/10 |
| 5,386,162 A | | 1/1995 | Horst | 310/51 |
| 5,583,387 A | | 12/1996 | Takeuchi et al. | 310/217 |
| 5,642,013 A | * | 6/1997 | Wavre | 310/254 |
| 5,693,995 A | * | 12/1997 | Syverson | 310/114 |
| 5,723,931 A | | 3/1998 | Andrey | 310/179 |
| 5,729,072 A | | 3/1998 | Hirano et al. | 310/258 |
| 5,744,888 A | | 4/1998 | Zajc et al. | 310/185 |
| 5,744,894 A | | 4/1998 | Cho et al. | 310/261 |
| 5,747,909 A | * | 5/1998 | Syverson et al. | 310/156.56 |
| 5,760,503 A | * | 6/1998 | Tsuchida et al. | 310/49 R |
| 5,767,601 A | | 6/1998 | Uchiyama | 310/190 |
| 5,828,147 A | | 10/1998 | Best et al. | 310/71 |
| 5,829,120 A | | 11/1998 | Uchida et al. | 29/598 |
| 5,838,086 A | | 11/1998 | Cuenot et al. | 310/156 |
| 5,841,212 A | | 11/1998 | Mita et al. | 310/156 |
| 5,864,192 A | | 1/1999 | Nagate et al. | 310/156 |
| 5,880,549 A | * | 3/1999 | Chiba et al. | 310/168 |
| 5,909,071 A | * | 6/1999 | Sakuma et al. | 310/51 |
| 5,909,072 A | | 6/1999 | Muller | 310/68 B |
| 5,917,263 A | * | 6/1999 | Sakuma et al. | 310/261 |
| 5,939,810 A | | 8/1999 | Uchida et al. | 310/156 |
| 5,965,967 A | * | 10/1999 | Liang et al. | 310/263 |
| 5,969,454 A | * | 10/1999 | Pengov et al. | 310/162 |
| 6,013,962 A | * | 1/2000 | Nashiki | 310/156.55 |
| 6,013,963 A | * | 1/2000 | Shelton, Jr. | 310/179 |
| 6,025,665 A | | 2/2000 | Poag et al. | 310/89 |
| 6,028,385 A | * | 2/2000 | Pengov et al. | 310/166 |
| 6,031,311 A | * | 2/2000 | Lee | 310/156.57 |
| 6,049,153 A | | 4/2000 | Nishiyama et al. | 310/156 |
| 6,097,120 A | | 8/2000 | Horng | 310/90.5 |
| 6,144,132 A | * | 11/2000 | Nashiki | 310/156.55 |
| 6,175,177 B1 | | 1/2001 | Sabinski et al. | 310/156 |
| 6,194,805 B1 | * | 2/2001 | Heese et al. | 310/166 |
| 6,204,626 B1 | | 3/2001 | Nakamura | 318/700 |
| 6,232,691 B1 | * | 5/2001 | Anderson | 310/179 |
| 6,249,067 B1 | * | 6/2001 | Schob et al. | 310/68 B |
| 6,271,613 B1 | * | 8/2001 | Akemakou et al. | 310/181 |
| 6,313,558 B1 | | 11/2001 | Abukawa et al. | 310/254 |
| 6,335,582 B1 | * | 1/2002 | Abukawa et al. | 310/214 |
| 6,340,857 B2 | | 1/2002 | Nishiyama et al. | 310/156.53 |
| 6,355,996 B1 | | 3/2002 | Birkestrand | 310/54 |
| 6,369,473 B1 | | 4/2002 | Baumeister et al. | 310/71 |
| 6,388,346 B1 | * | 5/2002 | Lopatinsky et al. | 310/63 |
| 6,396,181 B1 | * | 5/2002 | Akemakou | 310/156.38 |
| 6,400,059 B1 | | 6/2002 | Hsu | 310/254 |
| 6,441,525 B1 | * | 8/2002 | Koharagi et al. | 310/156.56 |
| 6,448,673 B1 | * | 9/2002 | Brown et al. | 310/17 |
| 6,518,750 B1 | * | 2/2003 | Lin et al. | 324/207.2 |
| 6,525,442 B2 | * | 2/2003 | Koharagi et al. | 310/156.48 |
| 6,531,797 B2 | * | 3/2003 | Eydelie et al. | 310/71 |
| 6,559,567 B2 | * | 5/2003 | Schob | 310/90.5 |
| 6,570,288 B1 | | 5/2003 | Kaizuka et al. | 310/156.55 |
| 6,573,629 B1 | | 6/2003 | Morimatsu | 310/166 |
| 6,661,137 B2 | * | 12/2003 | Gauthier | 310/75 R |
| 6,703,747 B2 | * | 3/2004 | Kawamura | 310/179 |
| 6,724,114 B2 | | 4/2004 | Horst | 310/154.11 |
| 6,727,618 B1 | * | 4/2004 | Morrison | 310/90.5 |

FOREIGN PATENT DOCUMENTS

| | | | | |
|---|---|---|---|---|
| EP | 0 365 689 A1 | 5/1990 | | |
| EP | 0 438 594 A1 | 7/1991 | | |
| EP | 0 669 699 A1 | 8/1995 | | |
| EP | 0 777 312 | 6/1997 | | |
| EP | 0 823 771 A1 | 2/1998 | | |
| EP | 0 866 540 A2 | 9/1998 | | |
| EP | 0 872 943 A1 | 10/1998 | | |
| EP | 0 909 009 A1 | 4/1999 | | |
| EP | 1 010 660 | 6/2000 | | |
| EP | 1 050 948 | 11/2000 | | |
| FR | 2 655 784 A1 | 6/1991 | | |
| FR | 2784815 A | * 10/1998 | H02K/1/22 | |
| FR | 2 784 815 A1 | 4/2000 | | |
| GB | 258981 | 10/1926 | | |
| JP | A 60-234451 | 11/1985 | | |
| JP | 63-144731 | 6/1988 | H02K/1/16 | |
| JP | 02097262 A | * 4/1990 | H02K/29/00 | |
| JP | 4-33551 | 2/1992 | H02K/21/22 | |
| JP | A 7-107707 | 4/1995 | | |
| JP | A 7-264822 | 10/1995 | | |
| JP | 9-322455 | 12/1997 | | |
| JP | 10-126990 | 5/1998 | | |
| JP | A 10-146030 | 5/1998 | | |
| JP | 10-164807 | 6/1998 | H02K/21/16 | |
| JP | 11004553 A | * 1/1999 | H02K/1/16 | |
| JP | 2000152537 | 5/2000 | | |
| JP | A 2000-333407 | 11/2000 | | |
| JP | 2002-10606 | 1/2002 | H02K/29/00 | |

* cited by examiner

FIG_3

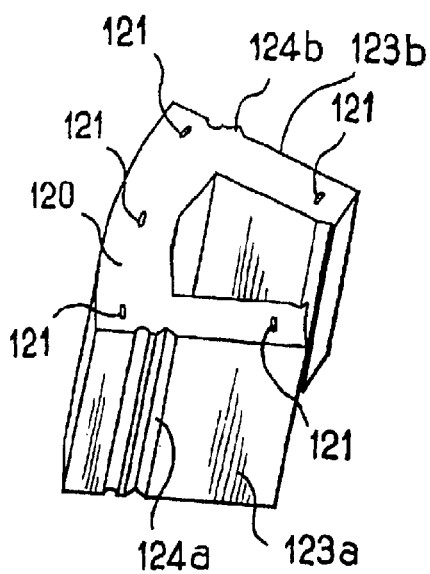
FIG_6
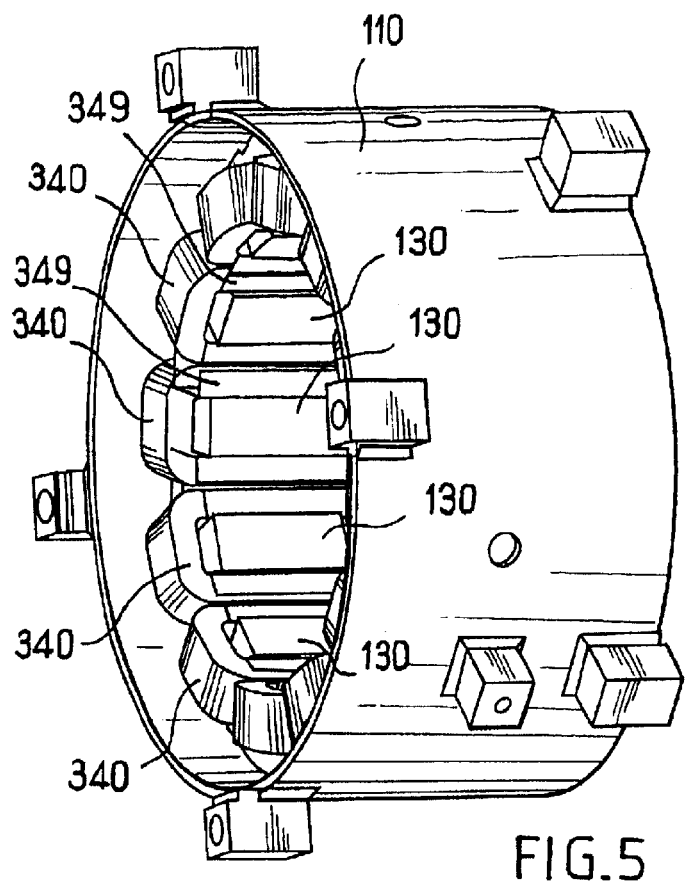
FIG_5
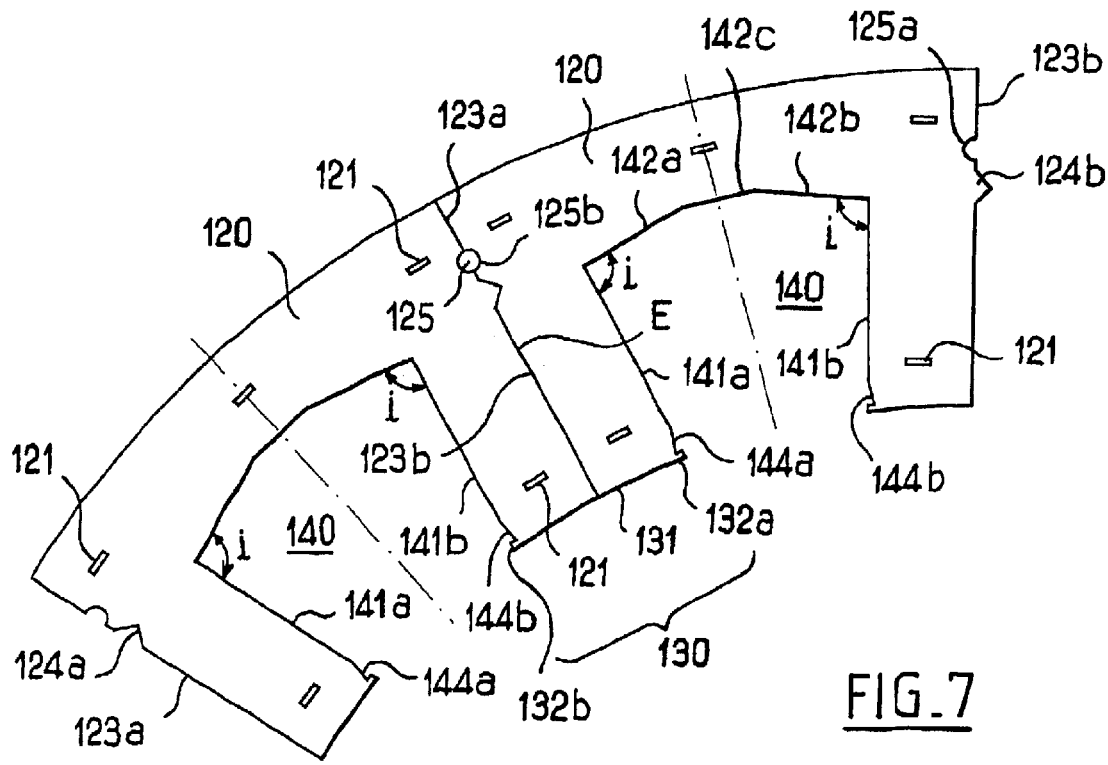
FIG_7

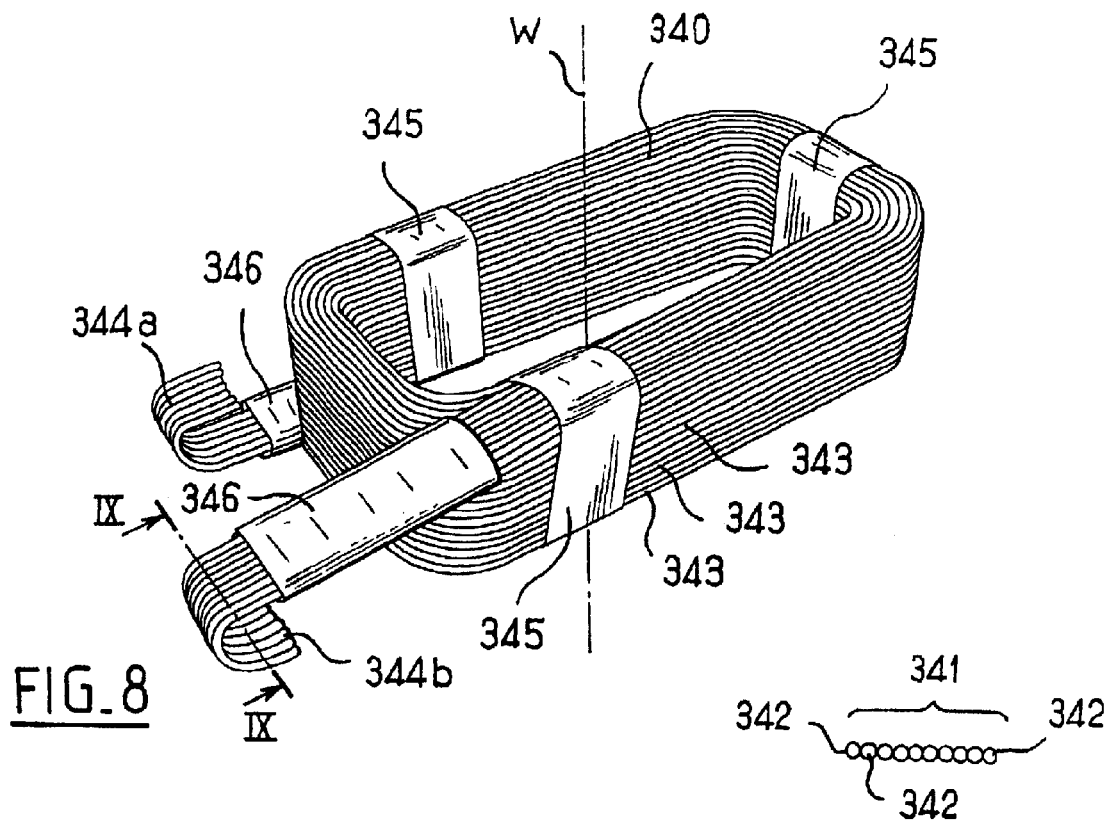
FIG.8
FIG.9
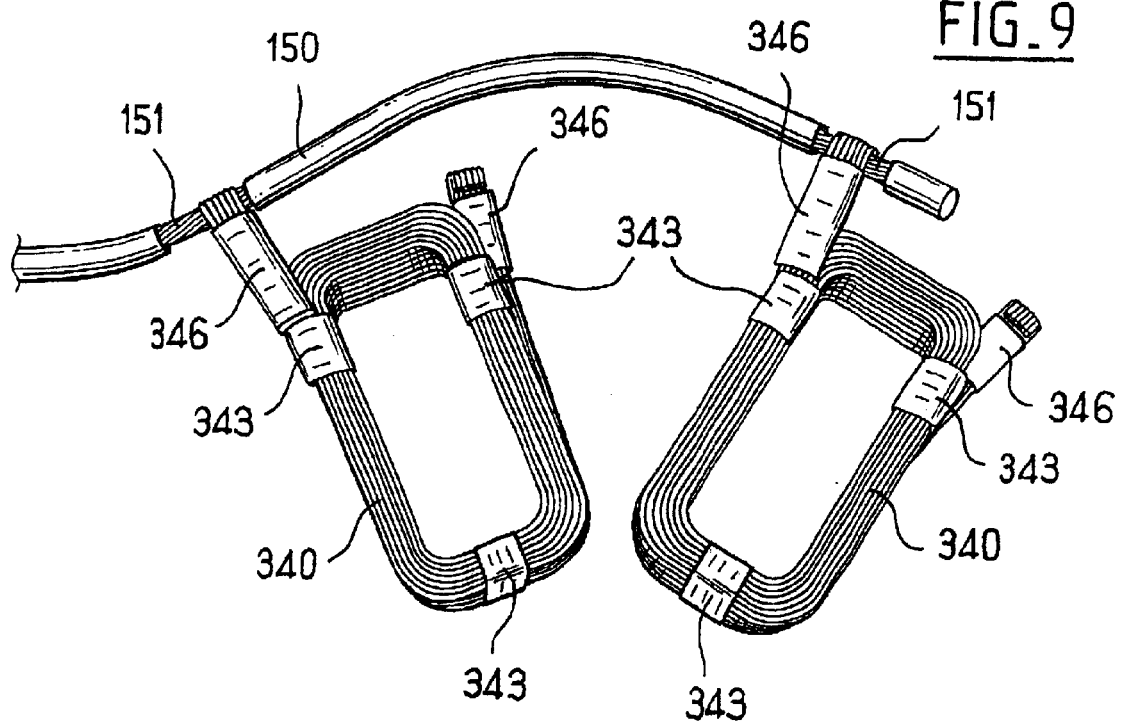
FIG.10

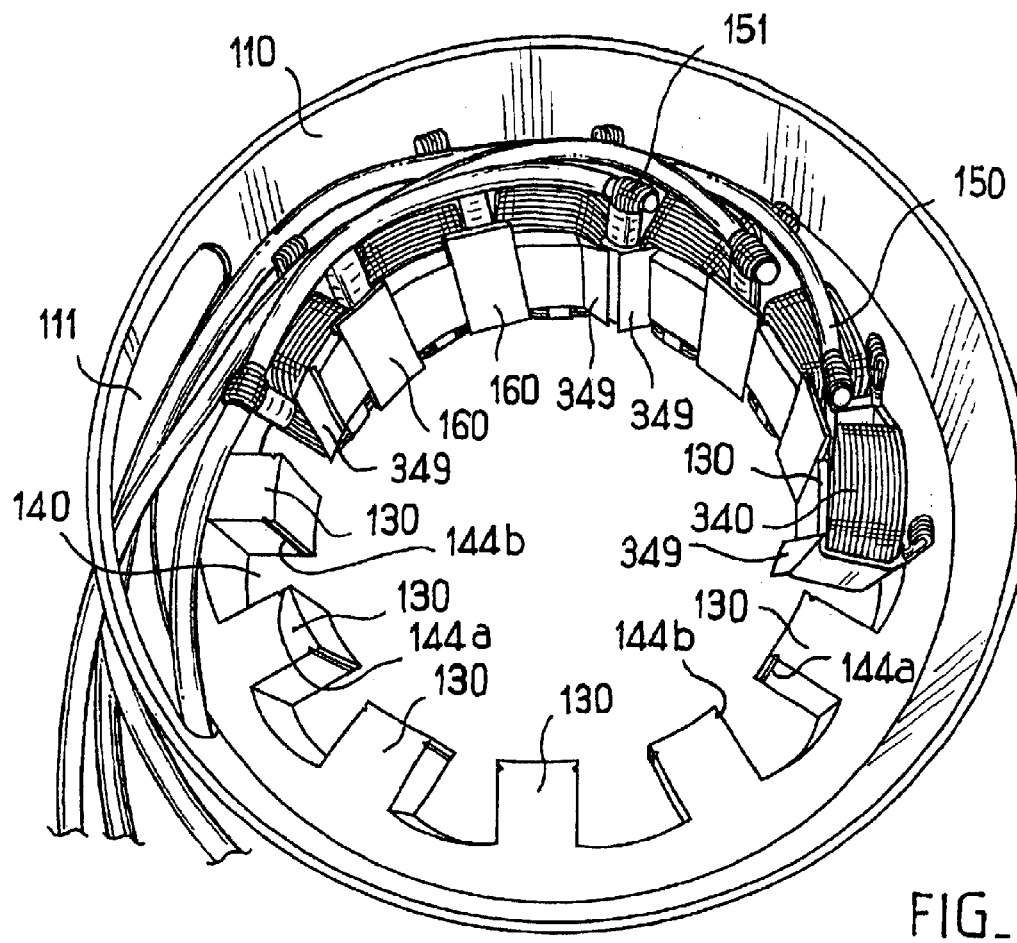
FIG_11
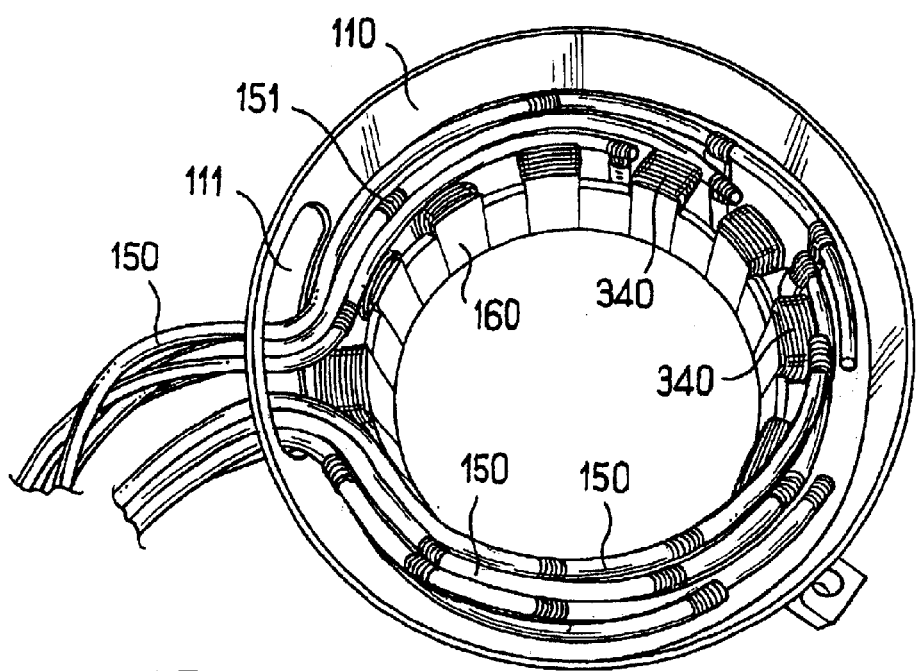
FIG_12

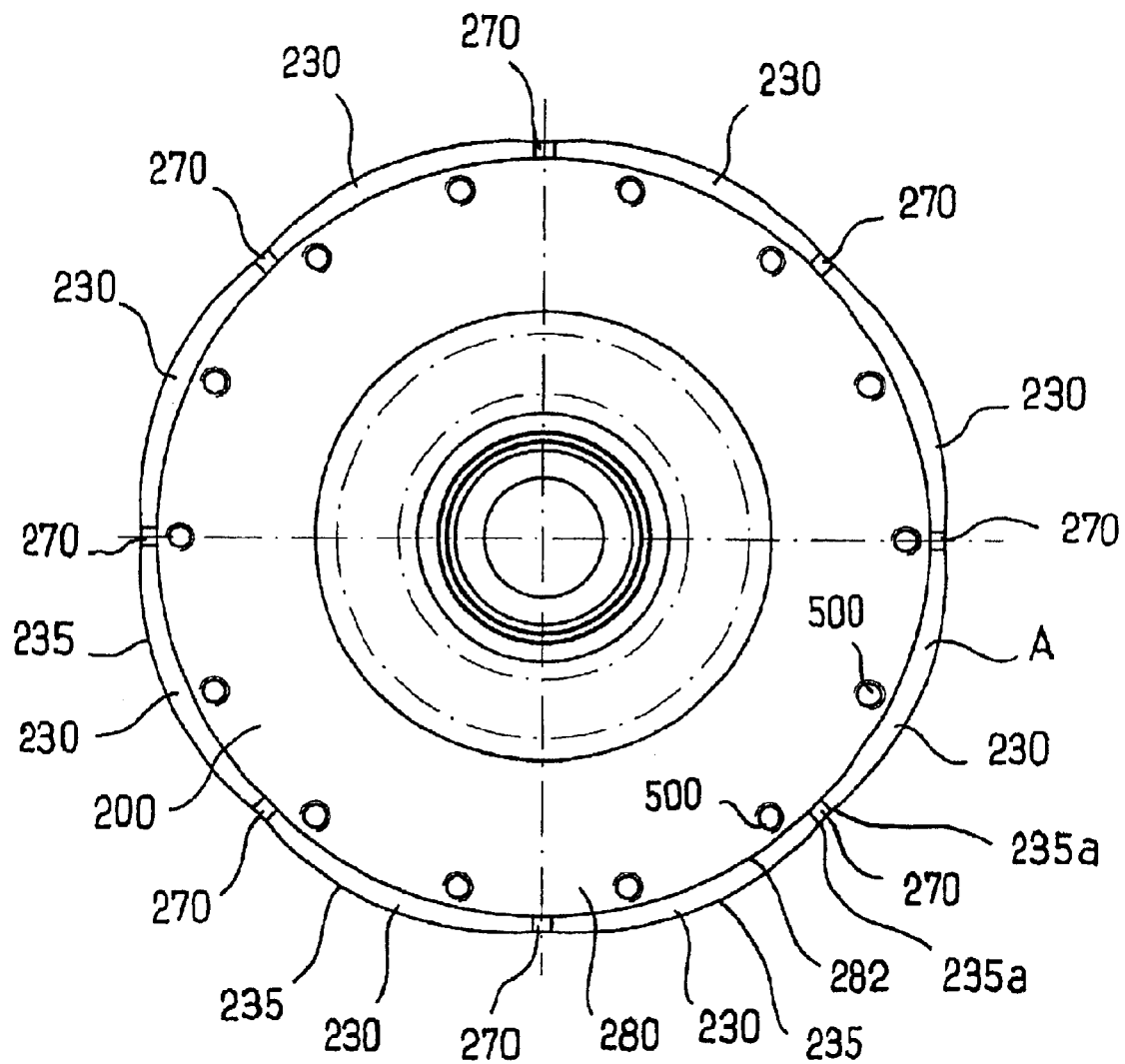
FIG_13

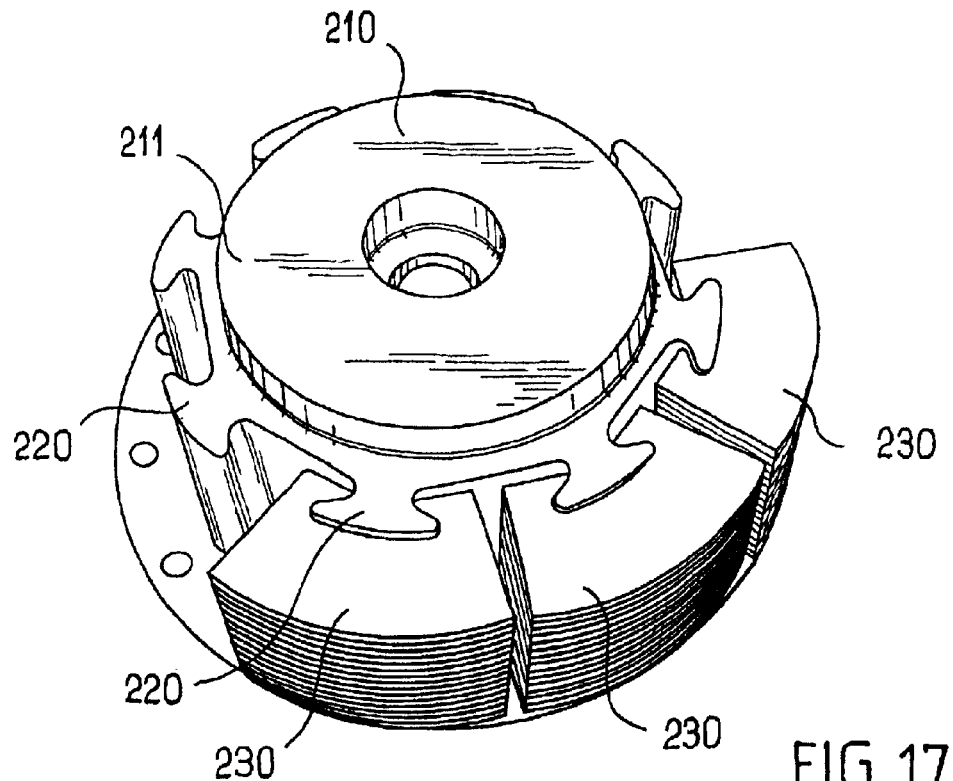
FIG_17
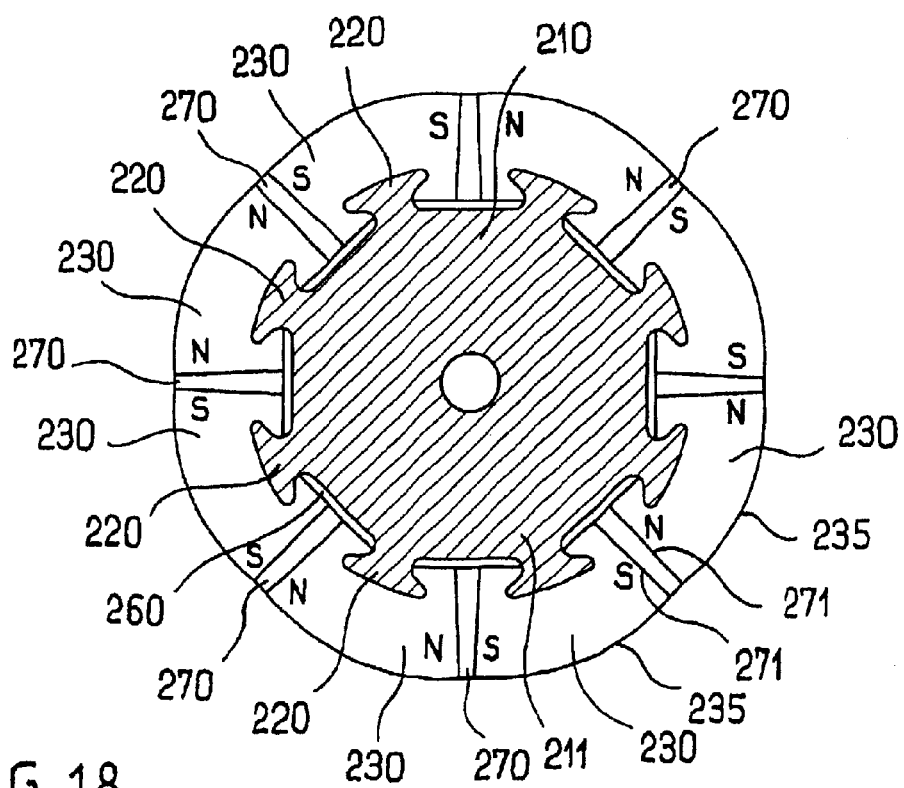
FIG_18

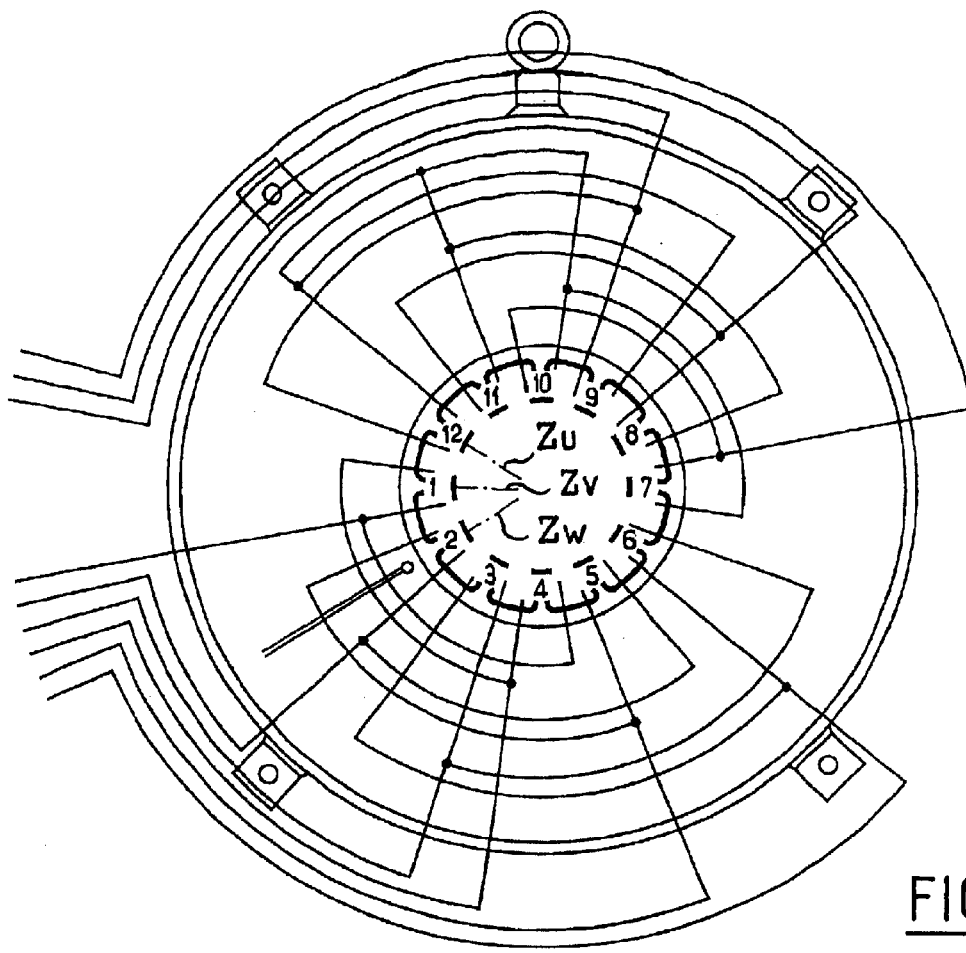
FIG_19
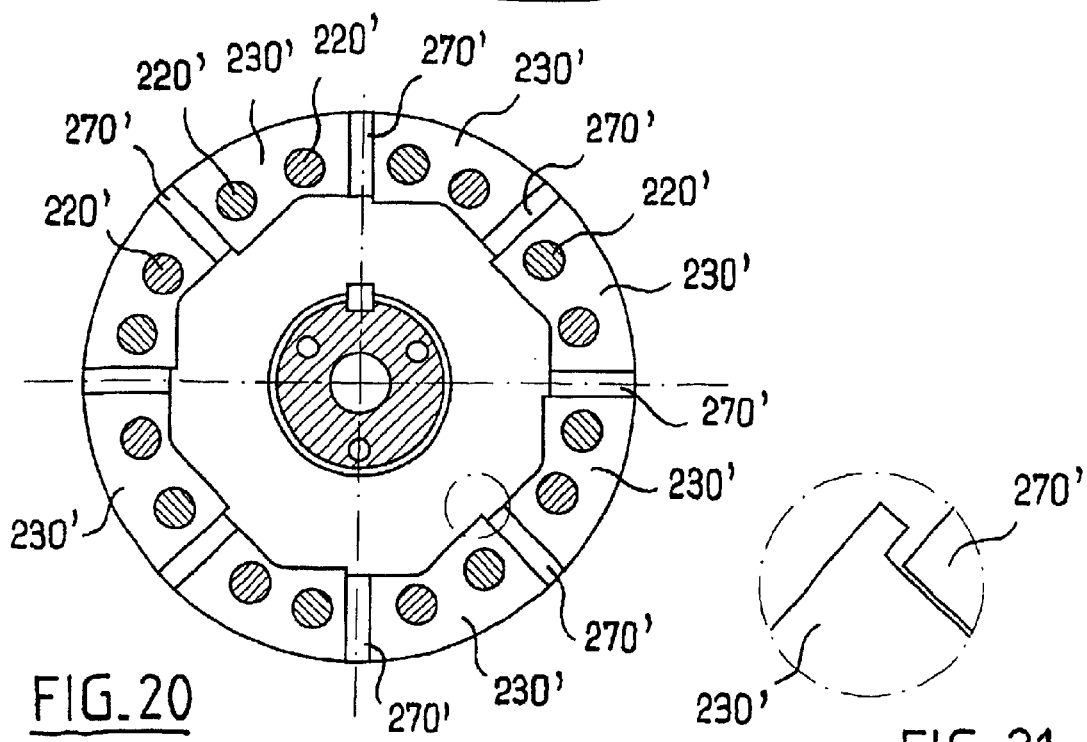
FIG_20
FIG_21

ROTARY ELECTRIC MACHINE HAVING A FLUX-CONCENTRATING ROTOR AND A STATOR WITH WINDINGS ON TEETH

BACKGROUND OF THE INVENTION

The present invention relates to rotary electric machines, and more particularly to synchronous motors including permanent magnet rotors.

U.S. Pat. Nos. 4,302,693 and 4,339,874 describe flux-concentrating rotors without specifying the nature of the stator. In those rotors, the magnets are wedge-shaped, being disposed between pole pieces that are welded to the shaft of the rotor. As a result, manufacture of the rotor is relatively complex. In addition, for a rotor that rotates at high speed, the magnets exert shear forces on the pole pieces that can lead to their becoming detached, if they are retained by poor quality fastening. Those rotors are quite old and so far as the Applicant is aware they did not lead to significant commercial development.

European patent application No. EP-A-0 872 943 discloses a rotary electric machine in which the rotor has magnets placed on its surface and the magnetic circuit of the stator receives individual coils. Such a machine is not designed to rotate at high speeds of rotation since the currents induced at the surface of the rotor at high speeds tend to heat the magnets, and magnets do not withstand high temperatures. By way of example, when such magnets are mounted on the surface without being fractioned, the limiting speed of rotation is about 200 revolutions per minute (rpm) for a 16-pole rotor, for example, and about 400 rpm for an 8-pole motor, and that is found to be insufficient in certain applications. One solution for avoiding overheating of the magnets consists in fractioning them, but that complicates manufacture and increases cost. In addition, the number of magnets to be provided when fractioning is used increases with the square of speed, such that in addition to its cost, that solution becomes physically inappropriate once the required speed is relatively high, e.g. greater than a few thousand rpm. In addition, in the machine described in application EP-A-0 872 943, magnets dedicated solely to detecting rotation of the rotor are mounted on the rotor, thereby complicating manufacture thereof. The stator exerts diametrically opposite rotating radial forces on the rotor. This causes the stator to be subjected to mechanical stress tending to ovalize it, thus generating vibration and noise. Finally, the width of the teeth is constant which gives rise to at least two drawbacks: firstly the magnetic material of the stator can become saturated at the roots of the teeth; and secondly replacing a coil requires the stator to be re-impregnated, so as to lock the coil properly in place on the stator, which means that the machine cannot be repaired on site and must be returned to the manufacturer.

Application EP-A-0 823 771 describes a stator having one winding on each tooth. The magnetic circuit of the stator is made up by assembling together sectors which define air-gaps halfway across the slots. In such a machine, a reluctance effect is desired and is obtained by seeking to maximize the difference $L_d$-$L_q$, where $L_d$ is the inductance on the forward axis and $L_q$ is the inductance on the quadrature axis (conventional notation). The drawback is that torque ripple is generated. Furthermore, subdividing the stator into sectors as described in application EP-A-0 823 771 weakens the stator since the bearing surfaces between the sectors are relatively narrow. Furthermore, the magnetic flux passes through as many air-gaps as there are sectors, thereby reducing the efficiency of the machine.

U.S. Pat. No. 5,829,120 describes a flux-concentrating rotor having links between pole pieces for facilitating magnet positioning. Such a rotor is relatively difficult to manufacture because of the presence, in certain embodiments, of narrow lamination portions outside the rotor for holding the pole pieces.

U.S. Pat. No. 5,091,668 also describes a flux-concentrating rotor, in which the pole pieces are connected to the rotor shaft by dovetail connections and the magnets are in the form of rectangular parallelepipeds. Such a rotor is unsuitable for high speeds of rotation since centrifugal force tends to move apart those regions of each pole piece which clamp onto the corresponding spline formed on the shaft. It is therefore necessary to engage the pole pieces on bars that are secured to the shaft. Nevertheless, such a solution is not entirely satisfactory since in addition to complicating manufacture of the rotor, the bars tend to become bowed when the rotor is long and/or its speed is high.

OBJECTS AND SUMMARY OF THE INVENTION

There exists a need for rotary electric machines that are reliable, of relatively high power, of low cost to manufacture, and that remedy the above-mentioned drawbacks in full or in part.

The invention seeks specifically to satisfy this need.

The invention achieves this by means of a novel rotary electric machine, in particular a novel synchronous motor, comprising a flux-concentrating rotor having permanent magnets disposed between pole pieces, together with a stator with windings on teeth.

In a stator with windings on teeth (concentrated winding), each tooth serves as the core of a winding. In addition, the number of teeth $n_{teeth}$ is preferably a function of the number of pairs of poles $n_{pairs}$ and the number of phases $n_{phases}$ in compliance with the relationship $n_{teeth}=n_{pairs}*n_{phases}$. Complying with this relationship makes it possible to avoid subjecting the stator to stresses that tend to ovalize it, unlike that which is described in above-mentioned application EP-A-0 872 943.

The combination of a flux-concentrating rotor and a stator with windings on teeth makes it possible to have a machine that is relatively powerful in a small volume, thus making it possible in particular to mount the motor in a cantilevered-out position at the end of a shaft, thereby reducing the number of bearings. The rotor can revolve at high speed since the magnets are protected from pulsating flux by the pole pieces. It is therefore not necessary to use fragmented magnets at high speed, as is the case with rotors in which the magnets are mounted on the surface.

The use of a flux-concentrating rotor also makes it easy for the magnets and the pole pieces to be made with shapes that serve to minimize the difference $L_d$-$L_q$, and thus to avoid using reluctance to generate driving force, contrary to the object of above-mentioned application EP-A-0 823 771, and as a result torque ripple is minimal. Advantageously, the rotor is made in such a manner that $L_d$ is substantially equal to $L_q$, in particular by giving a bulging shape to the faces of the pole pieces facing towards the stator.

Advantageously, the rotor magnets are wedge-shaped when the machine is observed along the axis of rotation of the rotor, of width that tapers going away from the axis of rotation of the rotor, and the pole pieces have cutouts and are engaged by means of the cutouts on splines of the shaft and they are fixed to the shaft by means of complementary shapes. The co-operation between the wedge-shaped magnets and the pole pieces connected to the shaft by complementary shapes is particularly advantageous in that the magnets can exert compression forces on the pole pieces at high speed, thus tending to oppose the spreading apart of the regions of the pole pieces which are situated on either side of the splines on which they are engaged. This makes it possible to avoid having to engage the pole pieces on bars, unlike that which is described in above-mentioned U.S. Pat. No. 5,091,668.

The above-mentioned splines are preferably formed integrally with a central portion of the shaft that is made out of a non-magnetic material, e.g. aluminum, aluminum alloy, non-magnetic steel, or composite materials.

Gaps are preferably left between the radially inner edges of the pole pieces and the shaft so as to make it easier to put the magnets into place. Such a structure differs from that described in European patent application EP-A-0 327 470 in which the pole pieces have cylindrical bearing surfaces that bear against the shaft.

In a particular embodiment in which wedge-shaped magnets are used, the cross-section of each spline presents a profile having opposite sides with portions that are inclined relative to a radius passing through the middle of the spline, e.g. inclined at an angle (ii) selected so as to make it possible for the splines to be made out of a material of shear strength that is weaker than that of the material used for making the pole pieces. By way of example, the angle (ii) is about 70° when the shaft is made of aluminum and the pole pieces of steel. The above-mentioned profile advantageously includes rounded portions so as to limit any risk of cracking. The rounded portions can have different radii of curvature ($R_a$, $R_c$).

As mentioned above, the face of each pole piece that faces the stator can advantageously bulge, being convex towards the stator. The rotor then has lobes at its periphery, thus serving to reduce both cogging and torque ripple as mentioned above, and also serving to establish a flow of cooling air.

In a particular embodiment, the rotor has at least one end cheek-plate of non-magnetic material and its periphery is set back from the edges of the magnets adjacent to the stator. This disposition makes it easier to detect the magnetic field of the magnets, as explained below, and makes it possible to use magnetic field detectors without any need to fit the rotor with magnets that are dedicated solely to measuring its rotation, unlike that which is described in above-mentioned application EP-A-0 872 943.

In a particular embodiment, the stator has individual coils. This makes the machine easier to build and maintain.

The stator can also have at least one individual coil comprising a bundle of insulated wires, the bundle being substantially flat and wound around a winding axis so as to form a plurality of superposed turns, with the cross-section of the bundle in the superposed turns having a long dimension extending substantially perpendicularly to the winding axis of the coil. The wires are preferably circular in section, having a diameter that lies in the range 0.3 millimeters (mm) to 2.5 mm, for example; this configuration makes it possible to reduce high frequency losses within the copper at high speeds of rotation of the rotor.

The inside section of the coil is preferably substantially rectangular. It is advantageously wider on one side than on the other so as to allow it to be mounted on a tooth of complementary profile with a certain amount of clamping. This clamping effect is particularly useful in contributing to ensuring that a pre-impregnated replacement coil does not move once it has been mounted on the stator, without it being necessary to re-impregnate the entire stator in an insulating resin. Such a clamping effect is not possible with the machine described in patent application EP-A-0 872 943 in which the teeth are of constant width. In addition, another advantage of having teeth of width that increases starting at a certain distance from their free ends going away from the rotor lies in the greater section offered to the magnetic field lines reducing the risk of the magnetic laminations becoming saturated. This makes it possible to use a magnetic material that is less expensive.

In a particular embodiment, the wires are stripped at their ends for making electrical connections to the coil and they are curved to form hooks. This serves in particular to make it easier to put a coil or its replacement into place. Said hooks can be directed towards a midplane of the coil, perpendicular to the winding axis.

The hook-shaped curved connection ends are advantageously soldered to locally stripped portions of sheathed electric cables.

The coil advantageously presents an inside section whose long side is longer than the axial size of the tooth on which it is engaged so as to leave a gap that is large enough to pass a detector that serves to deliver a signal representative of the rotation of the rotor.

Thus, the machine advantageously includes at least one magnetic field detector mounted on the stator in such a manner as to detect the magnetic field of the rotor magnets from a location that overlaps a peripheral region of the rotor when the machine is observed on the axis of rotation of the rotor. This peripheral region is advantageously the region which extends around an end cheek-plate situated so as to be set back from the radially outer edge of the magnets, as mentioned above.

For n-phase AC, the machine preferably has n detectors mounted on n consecutive teeth close to an opening through a case of the machine. Such a detector or detectors can be fixed on a front face of the magnetic circuit of the stator and each can extend along the radial axis of the corresponding tooth. Advantageously they pass through the coils engaged on the teeth, as mentioned above. This enables the machine to be more compact.

In addition to a magnetic field sensor, each detector can also include a temperature sensor and the location of the temperature sensor between the coil and the tooth serves to give a good image of the real temperature of the electrical circuit of the corresponding phase.

In a particular embodiment, the teeth of the stator have cutouts enabling shim to be fixed on the stator to hold the individual coils mounted on the teeth, each piece of shim having a separating partition extending substantially into the middle of the corresponding slot.

Still in a particular embodiment, the magnetic circuit of the stator has sectors that are assembled together, defining air-gaps that intersect the teeth at half-width. Advantageously, the sectors present portions in relief that co-operate on their docking sides. Making the magnetic circuit of the stator by using subdivided sectors serves in particular to reduce scrap. The presence of air-gaps at tooth half-width also serves to avoid interrupting the magnetic field lines which pass between the two half-teeth of the same sector. In addition, the bearing surfaces are larger in size than when the air-gaps are situated at slot half-width, as applies in particular to the machine described in application EP-A-0 823 771. This makes it possible to hold the sectors better and makes it possible to ensure that they remain cohesive merely by being forced into a cylindrical case.

The invention also provides a rotor of a rotary electric machine, the rotor comprising a plurality of pole masses and a plurality of magnets secured to the pole masses and fixed in housings of the rotor, wherein:

a) said housings are formed between the pole masses to receive the magnets;

b) the pole masses are arranged in such a manner that said housings become larger under the effect of centrifugal force when the rotor turns at a speed greater than a predetermined speed, with this enlargement tending to diminish as the speed of rotation decreases; and c) the magnets are arranged to engage in the gaps formed by the housings becoming enlarged when the rotor turns at a speed greater than said predetermined speed, such that the pole masses clamp against the magnets when the speed of the rotor drops back below said predetermined speed. The pole masses can be placed on splines of the shaft or they can be fitted on bars secured to the shaft.

Each spline is advantageously suitable for co-operating by complementary shapes with a corresponding cutout formed in the associated pole mass, as explained above. This ensures that the pole masses are held better to the shaft of the rotor by the forces induced on the pole masses by the wedge-shape of the magnets.

BRIEF DESCRIPTION OF THE DRAWINGS

Other characteristics and advantages of the present invention will appear on reading the following detailed description of non-limiting embodiments of the invention, and on examining the accompanying drawings, which drawings form an integral portion of the description, and in which:

FIG. 5 shows the stator in isolation, in perspective, and in diagrammatic manner;

FIG. 6 shows a sector of the magnetic circuit of the stator in isolation and in perspective;

FIG. 7 shows how the FIG. 6 sector is assembled with an identical sector;

FIG. 8 shows an individual coil in isolation and in perspective;

FIG. 9 is a section on IX—IX of FIG. 8;

FIG. 10 is a diagram showing a set of coils used for making the stator;

FIG. 11 is a diagram showing how sets of coils are put into place on the stator during manufacture thereof;

FIG. 12 is a view analogous to FIG. 11, in highly diagrammatic and simplified form once all of the sets of coils have been put into place, to show the circular paths followed by the current-feed cables;

FIG. 13 is a diagrammatic front view of the rotor;

FIG. 17 shows how pole pieces are assembled on the rotor shaft;

FIG. 18 is a diagrammatic cross-section of the rotor shaft after the magnets and the pole pieces have been put into place;

FIG. 19 is a non-limiting diagram showing one way in which the coils can be electrically interconnected (coils numbered 1 to 12);

FIG. 20 is a diagrammatic cross-section of a variant embodiment of the rotor; and FIG. 21 shows a detail of FIG. 20.

MORE DETAILED DESCRIPTION

Figure 1:
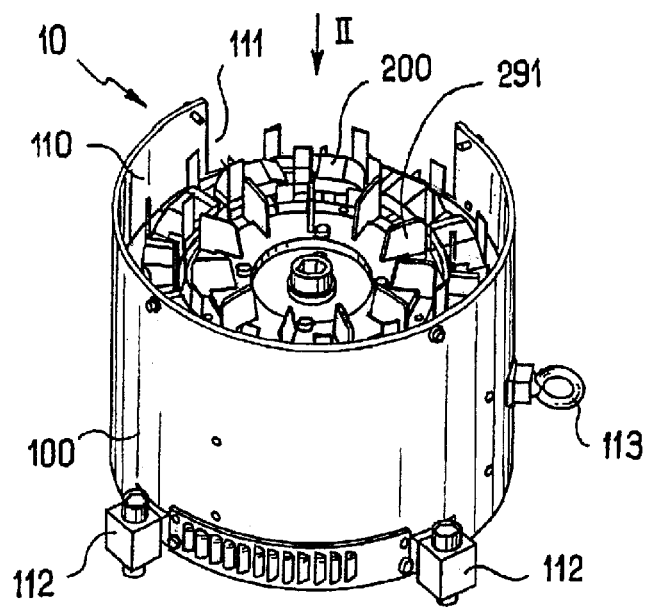
FIG. 1 is a diagrammatic perspective view of a synchronous motor constituting an embodiment of the invention.
Figure 2:
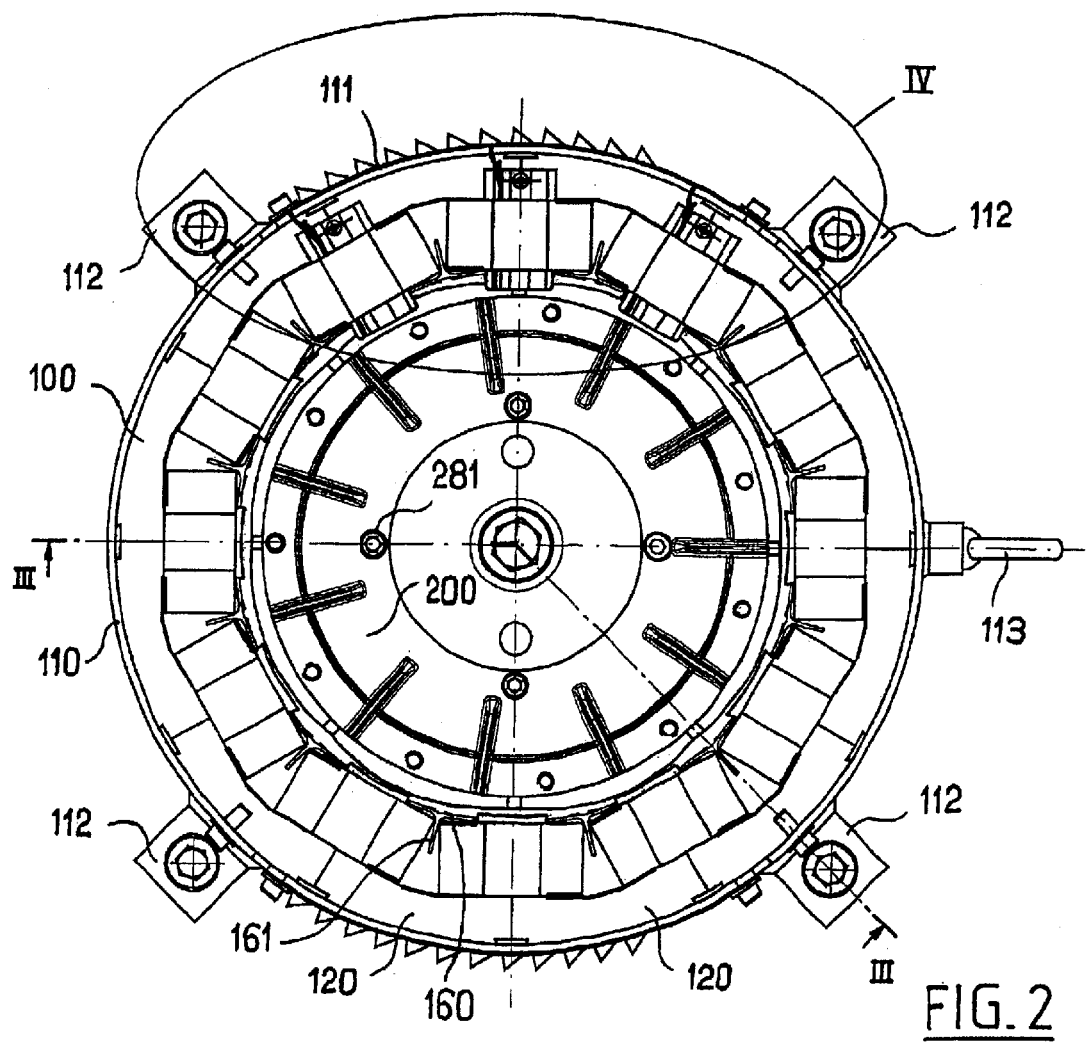
FIG. 2 is a diagrammatic plan view looking along arrow II of FIG. 1.

FIGS. 1 to 4 show a synchronous motor 10 of the invention comprising a stator 100 and a rotor 200. The motor 10 is brushless, it has a flux-concentrating rotor, and its stator has windings on teeth, and it operates on three-phase AC.

The stator 100 has a steel case 110 with a lateral opening 111 in particular for passing electrical conductors for powering the stator windings. On the outside, the case is provided with fixing tabs 112 and with a hook 113 for hoisting purposes.

In the example shown, the stator 100 has a magnetic circuit that comprises a plurality of identical sectors 120, one of which is shown in isolation, in perspective in FIG. 6.

Each sector 120 is constituted by a stack of identical magnetic laminations that are superposed and clipped together so as to constitute a unitary assembly, with clipping being obtained using a conventional technique whereby each lamination is subjected to spot deformation at a plurality of assembly points 121. Using a stack of magnetic laminations serves to limit losses due to induced currents. In a variant, the magnetic circuit of the stator could be formed by superposing laminations, each of generally annular shape, and then cutting out all of the teeth 130 of the stator therefrom. In another variant, each of the sectors could include a plurality of teeth. When assembled together, two adjacent sectors 120 form a tooth 130 of non-constant width, which tooth is used for receiving an individual coil 340, as can be seen in FIG. 5 in particular. The number of teeth $n_{teeth}$ in the example described is twelve, and the motor is designed to be powered with three-phase AC and the rotor has 8 poles. Naturally, the number of rotor poles could be different and in particular it could be equal to 12 or 16, for example. Although presenting certain drawbacks as mentioned above, the stator could also have a number of stator teeth that is not associated with the number of rotor pole pairs $n_{pairs}$ and the number of phases $n_{phases}$ by the relationship $n_{teeth} = n_{pairs} * n_{phases}$.

On its sides 123a and 123b for co-operating with adjacent sectors 120, each sector 120 has respective portions in relief 124a and 124b. These portions in relief 124a and 124b are complementary in shape having a profile that is generally triangular when seen from above, one being recessed and the other projecting, and having two sides that are substantially rectilinear and interconnected by a rounded portion. Co-operation between the portions in relief 124a and 124b contributes to positioning the sectors 120 properly relative to one another while assembling the magnetic circuit of the stator. Each sector 120 also has respective grooves 125a and 125b in its sides 123a and 123b, each groove being of semicircular cross-section and situated in the vicinity of the portions in relief 124a and 124b so that two adjacent grooves together form a hole 125 of circular section when the sectors 120 are assembled together. These holes 125 serve for receiving three detectors 190 as described in greater detail below.

In FIG. 7, it will be observed that the air-gap E at the interface between two adjacent sectors 120 occupies the middle of the corresponding tooth 130, thereby enabling magnetic losses to be reduced while the machine is in operation since magnetic flux can flow from one-half tooth to the adjacent half-tooth within the same sector 120 without encountering an air-gap. In addition, the sectors can be made with elements that are cut out practically without scrap using cutting tools of relatively small size, i.e. tools capable of high rates of throughput.

The sectors 120 are forced as a whole into the cylindrical case 110, and the magnetic circuit formed by the sectors 120 is held together by the radial compression forces exerted by the case 110 on the sectors 120, with the bearing surfaces between sectors being relatively large.

Each sector 120 defines a slot 140 whose opposite sides 141a and 141b are at an angle i of more than 90° relative to the adjacent regions 142a and 142b of the bottom of the slot 140, which regions are themselves perpendicular to radii passing through the line where the corresponding tooth meets the bottom of the slot. In the embodiment shown, the angle i is 90.4°, but this value is merely an example.

Each of the sides 123a and 123b of the sectors is generally in alignment with a radius, ignoring the portions in relief 124a, 124b, 125a, and 125b, and the width of each tooth 130 increases significantly on going away from the rotor (ignoring the cutouts 144a or 144b formed close to its free end 131 facing the rotor). It will be observed on examining FIG. 7 that in the vicinity of its free end 131 each tooth 130 does not have pole swellings, in contrast to many known stators which present slots that are semi-closed. In the example shown, the end portions 132a and 132b of each tooth 130 situated between the free end 131 and the cutouts 144a or 144b are in alignment with the sides 141a and 141b respectively.

The free end 131 is a circularly cylindrical portion on the same axis as the axis of rotation of the rotor, and it is concave towards the rotor.

The bottom of each slot includes a middle region 142c interconnecting the regions 142a and 142b and perpendicular to a radius intersecting the slot 140 at half-width, as represented by chain-dotted lines in FIG. 7.

As mentioned above, each tooth 130 receives an individual coil 340 occupying substantially half of the volume of each of the slots 140 adjacent to the tooth 130 in question.

FIG. 8 shows an individual coil 340 in isolation. This coil is formed by winding a bundle 341 of enameled electric wires 342 around a winding axis W, the bundle being substantially flat in cross-section, as can be seen in FIG. 9.

When the bundle 341 is observed in cross-section through the turns, its long dimension extends substantially parallel to the winding axis W.

In the example shown, the bundle 341 has about ten individual conductors 342, each of circular section. The bundle 341 forms about twenty superposed turns 343. Within the turns, the conductors 342 are electrically insulated from one another by using wire that is enameled. The conductors 342 are stripped at their ends to form electrical connection ends 344a and 344b, each of which is curved towards the midplane of the coil perpendicular to the winding axis W so as to form a hook. At the end of the coil manufacturing process, each of these hooks is open towards the body of the coil.

FIG. 8 shows that all of the conductors 342 at the end 344a are curved upwards and then towards the body of the coil, while the end wires 344b are curved downwards and then towards the body of the coil. The ends 344a and 344b do not project significantly beyond the planes of the two end faces of the coil. The turns constituting the coil body can be held in the superposed state by adhesive strips of cloth 345 prior to being impregnated in resin. Sleeves 346 of insulating sheath are engaged on the portions of the bundle 341 that extend between the ends 344a, 344b and the body of the coil.

The inside section of the coil 340 is generally rectangular in shape, as can be seen in FIG. 10. The coils 340 are wound on formers having two opposite large faces that are plane, making between them the same angle as between the sides 141a and 141b of a tooth, such that the width of the inside section of each coil varies perceptibly from one end face to the opposite face. This can be perceived if any attempt is made to mount a coil the wrong way round on a tooth 130 of the stator 100.

In FIG. 10, it can be seen that the coils 340 are electrically connected via one or other of the electrical connections ends 344a or 344b to partially-stripped sheathed electrical conductors 150 prior to being mounted on the teeth 130 of the stator 100. The hooks formed by the ends 344a and 344b are arranged, for example, in such a manner as to fit substantially around the outside diameter of the electrical conductors 150 in the stripped portions 151. These stripped portions can be formed not only at the ends of the electrical conductors 150 but also between them, by removing a limited length of insulating plastics material sheath.

In the example described, sets of two coils 340 are made up and subsequently mounted on the corresponding teeth 130, as shown in FIG. 11. Sheets 349 of insulation are interposed between the teeth and the bottoms of the slots and the coils. The ends of these sheets 349 can be seen in FIGS. 5 and 11.

Figure 4:
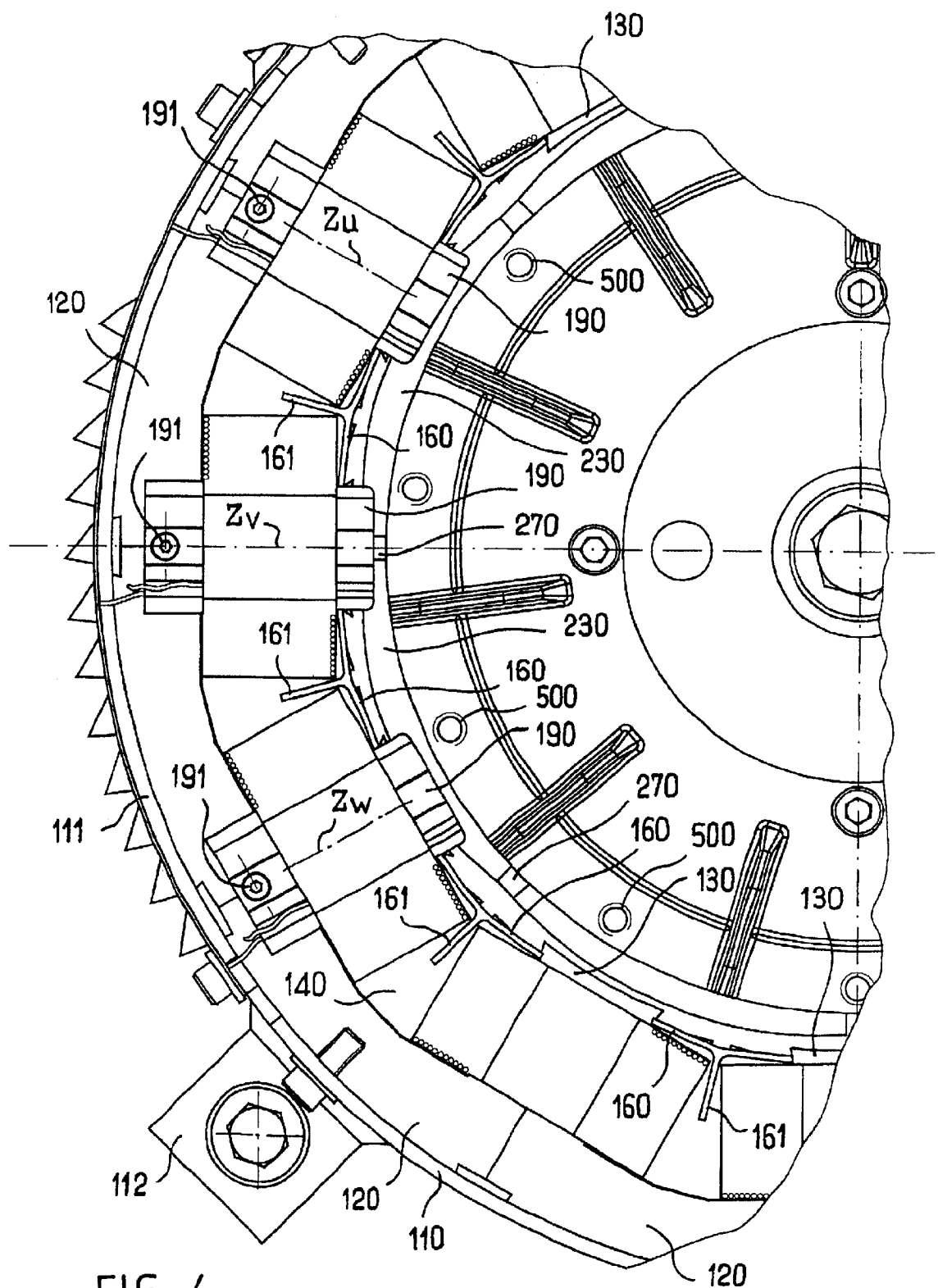
FIG. 4 is an enlarged view of a detail IV of FIG. 2.
Figure 14:
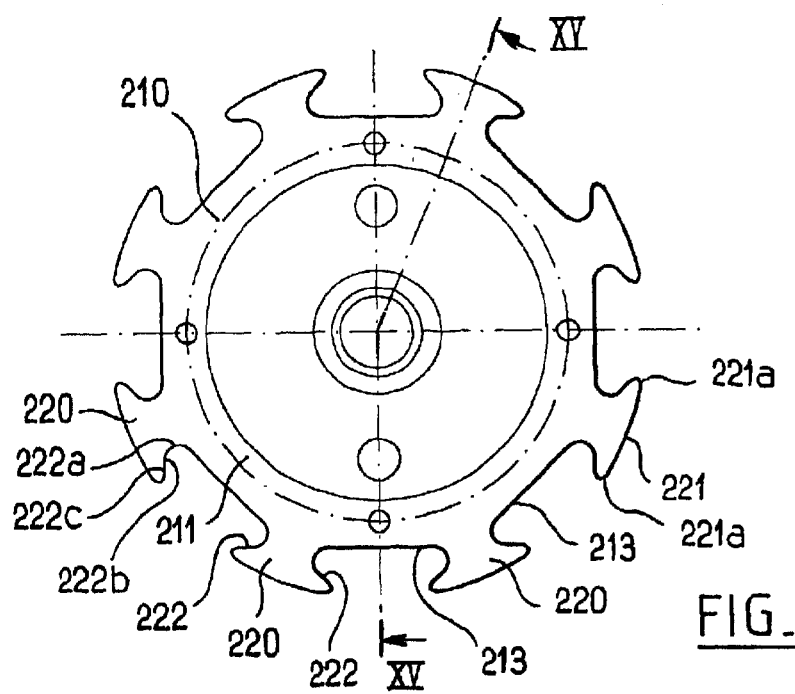
FIG. 14 is an end view of the rotor shaft shown in isolation.

As more and more coils 340 are mounted on the teeth 130, pieces of support shim 160 are slid into the cutouts 144a, 144b so as to close off the slots 140. As can be seen in FIG. 4, these pieces of shim 160 include partitions 161 extending between the portions of the two coils 340 that are received in the corresponding slot 140.

Once all of the coils 340 are in position, the cables 150 extend along substantially circular paths on one side of the magnetic circuit of the stator, being set back from the free ends 131 of the teeth, as shown in FIG. 12, these cables being attached to one another by collars, and then the stator is impregnated with an insulating resin in conventional manner. The particular electrical interconnections between the twelve coils is shown in FIG. 20, but that is merely one example.

It will be understood that it is particularly advantageous to use individual coils 340 installed on teeth of non-constant width in the manner described above, since that makes it much easier to replace coils 340. To replace a coil 340, once the rotor 200 has been removed, it suffices to unsolder the ends 344a and 344b of a coil from the corresponding stripped portions 151 and to remove the pieces of shim 160 concerned, whereupon the coil 340 can be extracted. A resin-impregnated replacement coil 340 can then be put into place by being engaged on the previously released tooth 130, after which its ends 344a and 344b can be soldered to the stripped portions 151. The convergence of the sides 141a and 141b of the tooth 130 towards the rotor and the corresponding shape of the inside section of the coil contribute to preventing the coil from moving on the tooth 130.

A repair can be performed on site without it being necessary to return the machine to the manufacturer, and without it being necessary to re-impregnate the stator, thus making it possible to shorten repair time. The motor 10 can advantageously be shipped together with one or more replacement coils 340.

The rotor 200 is described below with reference to FIGS. 13 to 18. The rotor comprises a non-magnetic shaft 210 shown in isolation in end view in FIG. 15, having a central portion 211 that is generally annular in shape, and at its periphery a plurality of splines 220 serving for securing pole pieces 230, each constituted by a stack of identical magnetic laminations that are superposed and clipped together. The use of superposed magnetic laminations serves to reduce losses due to induced currents. In cross-section, the splines 220 are generally T-shaped. The pole pieces 230 are not magnetically interconnected, since the shaft is made of a non-magnetic material.

Figure 16:
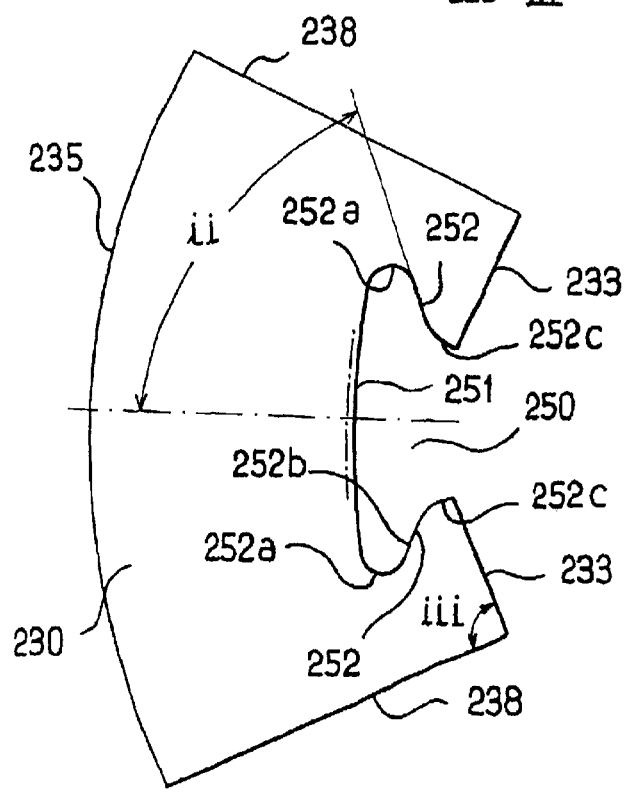
FIG. 16 is a plan view of a pole piece of the rotor shown in isolation.
Figure 15:
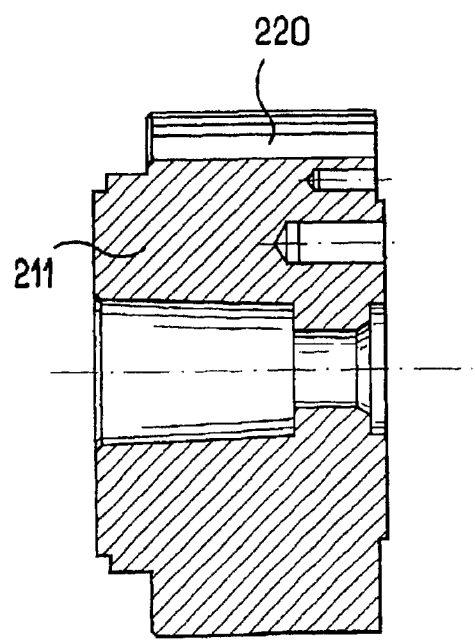
FIG. 15 is a diagrammatic axial section on XV—XV of FIG. 14.

FIG. 16 shows a pole piece 230 in isolation as seen from above. Each pole piece 230 has a cutout 250 of a shape adapted to engage on a spline 220 by sliding parallel to the axis of rotation of the rotor. The splines 220 are formed integrally with the central portion 211, out of aluminum, by being machined in the present example, but other techniques such as drawing or injection could be used. It will be observed that the pole pieces 230 in the example described are not engaged on anything other than the splines on the shaft. The splines 220 could be replaced by separate bars secured to endpieces, providing the rotor is relatively short and not intended to rotate at high speed, as explained below.

In the embodiment described, the cutout 250 is symmetrical about a midplane passing through the middle thereof and containing a radius. It has a bottom 251 for coming into contact with the radially outer face 221 of the corresponding spline 220. The bottom 251 connects opposite sides 252 each having a first rounded portion 252a of radius of curvature $R_a$, an oblique rectilinear intermediate portion 252b at a non-zero angle ii with the radius passing through the middle of the bottom 251, and a second rounded portion 252c of radius of curvature $R_c$. In the embodiment described, $R_a$ is 3 mm, $R_c$ is 5 mm, and the angle ii is 70°. The cutout 250 has a narrow opening thus engaging on a spline 220.

In general, the angle ii depends on the nature of the materials used for making the shaft 210 and the pole pieces 230, and it can be determined by computation using finite elements. The shape of the section of each spline 220 is substantially complementary to that of the cutout 250, excepting the presence of a chamfer 221a at the edge of the radially outer face 221 of the spline 220. Each side 222 of the spline thus has a rounded portion 222a having the same radius of curvature $R_a$ as the rounded portion 252a, a rectilinear portion 222b parallel to the portion 252b when the pole piece 230 is in place on the shaft 210, and a rounded portion 222c having the same radius of curvature $R_c$ as the portion 252c. The radially inner edges 233 of the pole piece 230 situated on either side of the slot 250 are set back from the regions 213 of the shaft 210 situated between the splines 220, as can be seen in FIGS. 17 and 18, in particular. A gap 260 is thus left between two adjacent splines 220, the pole pieces 230 engaged on the splines, and the shaft 210.

Figure 3:
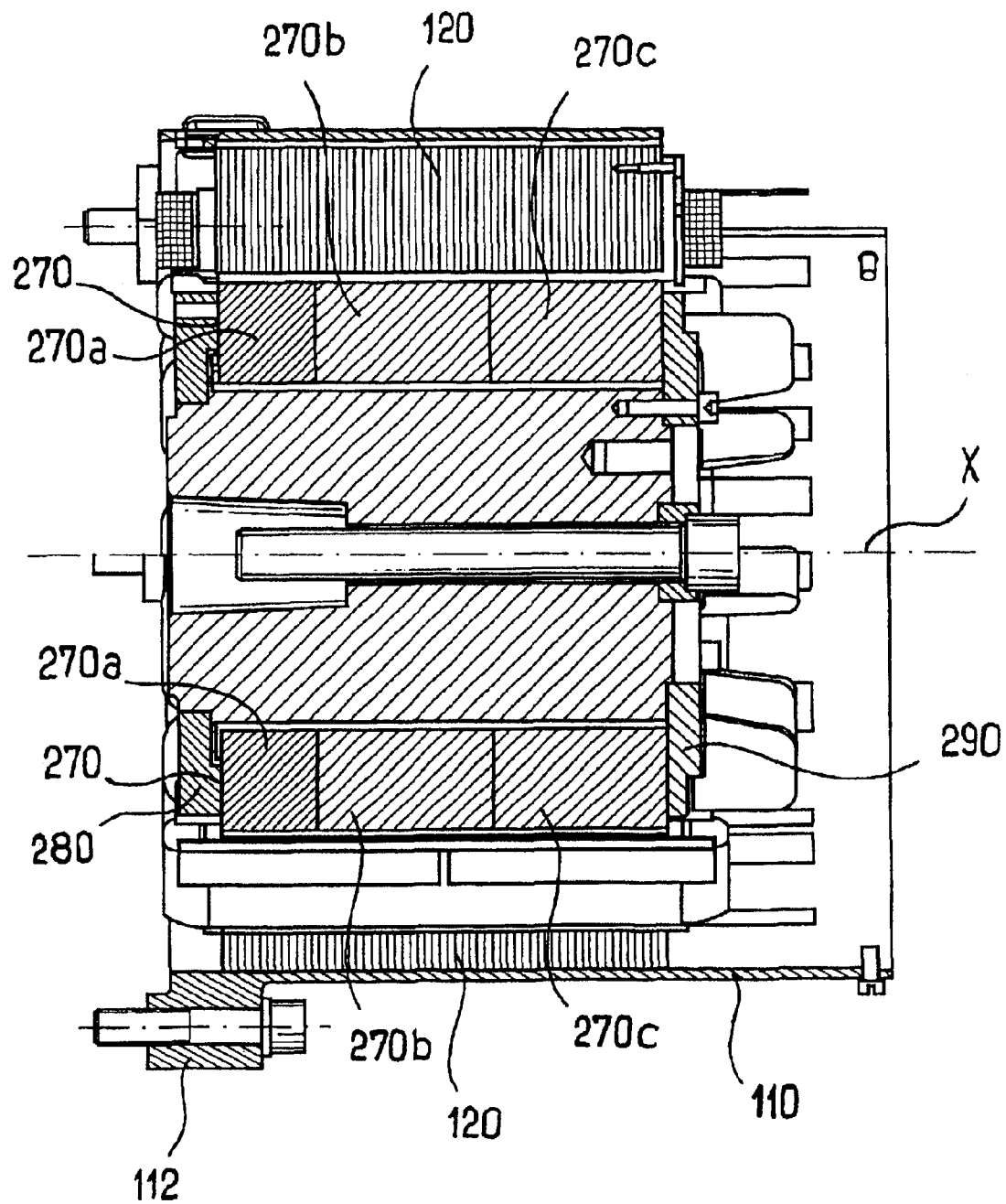
FIG. 3 is a diagrammatic axial section of the motor on III—III of FIG. 2.

Permanent magnets 270 of slightly trapezoidal section are disposed radially, being inserted between the pole pieces 230, as shown in FIG. 18. When observed along the axis of rotation of the rotor, each magnet 270 is slightly wedge-shaped, with its width tapering radially outwards. Each magnet 270 is magnetized transversely and can be formed as a single piece or it can be built up from a plurality of magnetic elements placed end to end. Same-polarity magnetic poles of two adjacent magnets 270 are directed towards the pole piece 230 situated between the magnets 270, as shown in FIG. 18. In the example shown, each magnet 270 is made up of three magnetic elements 270a, 270b, and 270c placed end to end along the axis of rotation X of the rotor, as can be seen in FIG. 3. In the example shown, the magnets 270 extend over practically the entire radial size of the sides 238 of the pole pieces 230 and they are in contact therewith.

The angle formed between the opposite plane faces of the magnets 270 that come into contact with the pole pieces 230 is quite small, being a few degrees only. The angle iii between the side 238 of a pole piece 230 and the adjacent edge 233 in the example shown in FIG. 16 is equal to 92.4°.

The radially outer side 235 of a pole piece 230 is of circular cross-section, and has a radius of curvature that is smaller than the maximum radius of the rotor such that each pole piece 230 presents an outside face which forms a slightly outwardly convex lobe, as can be seen in FIG. 18. The bulging shape of the pole pieces 230 makes it possible to reduce torque ripple and also to establish a flow of cooling air. In the example described, the shape of the outer side 235 and the ratio of the radial dimension of the magnets over their width is selected so as to have $L_q=L_d$ so that the motor turns without the reluctance effect.

When the rotor 200 turns at a speed greater than a predetermined speed, and because of the elasticity of the materials used, the housings formed between the pole pieces 230 and receiving the magnets 270 tend to become wider under the effect of centrifugal force, with such widening tending to diminish when the speed of rotation decreases again.

The radial size of the magnets 270 is selected in such a manner that when they are put into place in the corresponding housings in the rotor, their radially outer ends are set back from the radially outer edges of the pole pieces adjacent to the magnets.

The magnets 270 are installed so as to engage in the gaps formed by the housings becoming enlarged in the manner described above when the rotor turns at a speed greater than said predetermined speed such that the pole pieces 230 clamp against the magnets 270 when the speed of the rotor drops back below said predetermined speed. The presence of the gaps 260 makes it easier to put the magnets 270 into place; It will be understood that this provides means that are simple and effective for pressing the magnets 270 against the pole pieces 230. To fix the magnets 270, the rotor 200 can be rotated at a speed that is 10% greater than its nominal speed of rotation, for example, or even 20% greater than said nominal speed. The magnets 270 are easily put into place since it is not necessary to insert them initially between the pole pieces 230 with any very great force, the final positioning of the magnets 270 taking place automatically when the rotor 200 is rotated. In addition, by causing the rotor to turn faster or slower, it is possible if necessary to obtain greater or lesser displacement of the pole pieces 230 and the magnets 270 and to act to a small extent on the outside diameter of the rotor. This can make it possible to make magnets 270 and pole pieces 230, and also the stator 100, using manufacturing tolerances that are much slacker, since it is possible to adjust the outside diameter of the rotor 200 to a desired value by causing it to rotate at a faster or slower speed.

The magnets 270 present low electrical resistivity, but they are not subjected to heating that runs the risk of demagnetizing them because of the protection provided against pulsating flux by the pole pieces 230 at high speeds.

The wedge-shape of the magnets 270 allows compression forces to be exerted on the portions of the pole pieces 230 that contain the splines 220 so as to tend to close the cutouts 250 onto the splines 220, with this effect being increased with increasing speed, such that the assembly is self-locking. The above-mentioned compression forces enable the width of the pole pieces on either side of a spline to be reduced, and thus make it possible to benefit from greater width in the connection between the spline and the shaft and thus make it possible for the shaft to be made out a material that is not mechanically as strong as non-magnetic steel, but is much less expensive and much lighter in weight, such as aluminum.

The end cheek-plates 280 and 290 are fixed to the shaft 210 at opposite ends thereof to prevent the pole pieces 230 and the magnets 270 from moving axially, should that be necessary. The cheek-plates define a stage of the machine. The rotor 200 can have a plurality of stages subdivided by intermediate cheek-plates, and the number of magnets 270 per stage can lie in the range 4 to 64, for example, possibly being equal to 8 as in the example shown for an 8-pole motor. When a plurality of stages are used and are separated by intermediate cheek-plates, the number of cheek-plates is preferably equal to the number of stages plus one.

The cheek-plates 280, 290 can be made of aluminum, for example, or out of non-magnetic steel. The cheek-plates 280 and 290 are fixed on the shaft 210 by means of bolts 281. Tapped holes 500 are made through the peripheries of the cheek-plates 280, 290 so as to enable balancing screws to be engaged.

As can be seen in FIG. 13, in particular, the cheek-plate 280 has a circular radially outer edge 282 which is set back from the radially outer edge 235 of the pole pieces 230 and the radially outer edges of the magnets 270, which lie substantially level with the ends 235a of the bulging faces.

An annular zone A is thus provided around the cheek-plate 280 in which it is possible to read the magnetic field of the magnets 270 of the rotor by means of detectors 190 of the kind shown in FIG. 4. In FIG. 4, it can be seen that the detectors 190 can overlap the rotor 200 to a small extent because the cheek-plate 280 is in a slightly set-back position.

In the embodiment described, there are three detectors 190, since the motor is a three-phase motor, with each detector comprising a Hall effect sensor arranged to detect the magnetic field over the peripheral region A of the rotor 200 around the cheek-plate 280. The magnetic field is read along an axis parallel to the axis of rotation of the rotor, the Hall effect sensor overlapping the peripheral region A. In the example shown, the detectors 190 are mounted on three consecutive teeth 130 situated in the vicinity of the opening 111.

Each detector 190 is fixed by a screw 191 on a tooth 130 of the stator, said screw 191 being engaged in a hole 125. Each detector 190 extends along the radial axis $Z_u$, $Z_v$, or $Z_w$ of the associated tooth and passes through the coil 340 engaged on that tooth. The coils 340 are provided for this purpose with an inside section of length that is large enough to enable the detector 190 to be passed. The space left between a coil and the corresponding tooth for passing the detector can be about 5 mm, for example, with such a space serving to insulate the coil from the tooth where there is no insulation 349.

It is advantageous to read the magnetic field of the permanent magnets 270 directly because that makes it possible to avoid adding special elements to the rotor whose sole purpose is to enable the angular position of the rotor to be read. This simplifies manufacture of the rotor and improves reliability. In addition, mounting detectors 190 in the gap between the coils 340 and the teeth 130 is particularly compact, while nevertheless providing easy access to the detectors 190 in order to replace them, should that be necessary.

Each detector 190 is positioned inside a coil 340 of given phase (u, v, and w). Each detector 190 makes it possible to detect which polarity of the rotor lies in register with the associated coil (and thus the corresponding phase) at a given instant. Each detector 190 delivers a high signal or a low signal depending on the polarity it detects. Each detector 190 has an electronic circuit for shaping the signals delivered by the Hall effect sensors so as to reduce sensitivity to interference. Depending on the position of the rotor, the various signals delivered by the detectors 190 can take up six possible combinations, and each change in the triplet constituted by the states of the detectors 190 corresponds to a determined angular position of the rotor. This makes it possible to determine the angular position of the rotor at precise instants, and to compute the position of the rotor between these instants by interpolation, given knowledge of its speed. The coils 340 can thus be excited in optimum manner with the desired amount of phase shift. The electrical current carried by each coil can thus be reduced to zero and change direction whenever a magnet lies on the axis of the corresponding tooth. Unlike a reluctance motor which operates in attraction only, the above-described motor operates without reluctance ($L_d$ being equal to $L_q$ in the example under consideration) both in attraction and in repulsion, and enables a large amount of torque to be generated.

Each detector 190 also has a temperature sensor.

Knowing the temperatures of the coils 340 of the various phases makes it possible to detect possible misfunction of the motor.

On at least one of its cheek-plates 280 and 290, the rotor 200 has cooling fins 291 which can be seen in FIG. 1, in particular. It will be observed that an additional cooling effect is obtained by the presence of the lobes 235 formed by the pole pieces 230 at the periphery of the rotor, which make it possible to generate a flow of cooling air within the inside of the motor.

The motor as described above with reference to FIGS. 1 to 19 presents numerous advantages, including:

its particularly compact structure enables it to be mounted in a cantilevered-out position at the end of a shaft, thus making it possible to reduce the number of bearings and to reduce mechanical losses due to friction, and also to reduce problems of lubrication;

the rotor can turn at a high speed of rotation without running the risk of magnets becoming detached or of the magnets becoming overheated, since the magnets are little exposed to currents induced on the surface;

the individual coils are easy to install and to replace, and there is no need to re-impregnate the stator;

the mass of the magnets can be quite small, and there is no need for them to be fractioned;

the number of teeth and the number of coils is relatively small, thus facilitating manufacture;

the heads of the coils are very short, thus making it possible to obtain a structure that is compact axially;

the phases can be separated electrically without contact and without crossover;

the turns of the coils can be touching, thereby ensuring that the slots are well filled; and torque ripple can be made negligible.

By way of example, the invention makes it possible to manufacture rotary electric machines from a range of stator and rotor magnetic circuits that are prefabricated, of different diameters, with the stators presenting teeth that are standard. By way of example, the axial dimensions of the magnetic circuits of the rotor and of the stator can be selected as a function of the power to be delivered, by stacking a larger or smaller number of sectors and of pole pieces. By way of example, only the coils need to be made to measure for a stator magnetic circuit built up from prefabricated elements, by determining the number of turns in the coil, the diameter of the conductor wires in its flat bundle, and the number of said wires, as a function of the performance required by the user of the machine.

The invention is not limited to a synchronous motor and it is also applicable to a generator. The rotor can be internal or external.

The electrical power of the machine can lie in the range 1 kilowatt (kW) to 750 kW, for example. The speed of rotation of the rotor can lie in the range 1000 rpm to 10,000 rpm, for example. A machine of the invention can also find applications when speed is below 1000 rpm. The outside diameter of the machine can lie in the range 50 mm to 1 meter (m), for example; in the most widespread applications, the outside diameter can lie in the range 100 mm to 600 mm.

The invention is not limited to some particular number of poles nor is it limited to the stator being powered with three-phase AC. Electricity can be polyphase having n phases, where n is not equal to three.

The shaft can be made out of non-magnetic materials other than aluminum, for example aluminum alloys.

Although less advantageous, magnets in the form rectangular parallelepipeds or having some other shape could also be used, possibly in combination with magnets that are wedge-shaped.

The teeth of the stator can have a face facing the rotor that is of a shape that is not circularly cylindrical about the axis of the rotor.

The slots can be half-closed.

In a variant embodiment, the pole pieces 230' are stacked on bars 220' held by end cheek-plates secured to the shaft, as shown in FIG. 20. In this figure, it can be seen that the magnets 270' which are wedge-shaped are disposed between the pole pieces 230' which are engaged on the bars 220'. The pole pieces can include respective steps, as shown in FIG. 21, so as to hold the magnets 270' prior to centrifuging.

What is claimed is:

1. A rotary electric machine comprising:
   a flux-concentrating rotor comprising permanent magnets disposed between non-magnetically interconnected pole pieces; and
   a stator comprising
      teeth having a free end deprived of pole swellings and a concentrated winding.

2. A machine according to claim 1, wherein the pole pieces and the magnets are configured so as to minimize the difference $L_d-L_q$ where $L_d$ is inductance on a forward axis and $L_q$ is inductance on a quadrature axis.

3. A machine according to claim 1, wherein the teeth are of non-constant width, increasing in width with increasing distance from the rotor starting from a determined distance from their free ends.

4. A machine according to claim 1, wherein the magnets are wedge-shaped when observed along an axis of rotation of the rotor, of width that tapers going away from the axis of rotation of the rotor.

5. A machine according to claim 1, wherein the pole pieces have cutouts and are engaged via said cutouts on splines on a shaft of the rotor.

6. A machine according to claim 5, wherein said splines are formed integrally with a central portion of the shaft.

7. A machine according to claim 6, wherein the splines and the central portion of the shaft are made of a non-magnetic material.

8. A machine according to claim 5, wherein the pole pieces have radially inner edges and gaps are left between said radially inner edges and the shaft.

9. A machine according to claim 5, wherein each spline presents a cross section having a profile having opposite sides with inclined portions at an angle to a radius passing through a middle of the spline.

10. A machine according to claim 9, wherein the angle is about 70°.

11. A machine according to claim 9, wherein said profile includes rounded portions.

12. A machine according to claim 11, wherein the rounded portions have different radii of curvature.

13. A machine according to claim 1, wherein each pole piece has, on a side facing towards the stator, a face that is non circular around an axis of rotation of the rotor and convex towards the stator.

14. A machine according to claim 1, wherein the magnets have edges that are adjacent to the stator and the rotor has at least one, at one axial end, check-plate of non-magnetic material, with a periphery of the check-plate being set back from said edges.

15. A machine according to claim 1, the stator having $n_{teeth}$ teeth, the rotor having $n_{pairs}$ pairs of poles, and the current having $n_{phases}$ phases, wherein the number of teeth $n_{teeth}$ satisfies $n_{teeth}=n_{pairs}*n_{phases}$.

16. A machine according to claim 1, wherein the rotor is configured to rotate at a speed lying in the range 1000 rpm to 10,000 rpm.

17. A machine according to claim 1, wherein the machine has an outside dimension in the radial direction that lies in the range 50 mm to 1 m.

18. A machine according to claim 1, wherein the stator has individual coils each removably disposed on one tooth.

19. A machine according to claim 1, wherein the stator has at least one individual coil comprising a plurality of superposed turns of a substantially flat bundle of insulated wires wound around a winding axis, the cross-section of the bundle having a long dimension that extends substantially perpendicularly to the winding axis.

20. A machine according to claim 19, wherein the wires are of circular section, having a diameter lying in the range 0.3 mm to 2.5 mm.

21. A machine according to claim 19, wherein an inside section of the coil perpendicular to the winding axis is substantially rectangular.

22. A machine according to claim 19, wherein an inside section of the coil perpendicular to the winding axis is larger on one side than on the other, and the stator comprises a tooth presenting a complementary profile.

23. A machine according to claim 19, wherein the wires are curved to form hooks at the electrical connection ends of the coil.

24. A machine according to claim 23, wherein the hooks are directed towards a midplane of the coil, perpendicular to the winding axis.

25. A machine according to claim 19, wherein the coil has, perpendicular to the winding axis, an inside section longer than an axial dimension of the tooth on which the coil is engaged, and a detector suitable for delivering a signal representative of rotation of the rotor being engaged in a gap formed between an inside face of the coil and a face of the tooth.

26. A machine according to claim 1, having at least one detector comprising a magnetic field sensor mounted on the stator in such a manner as to detect the magnetic field of the magnets of the rotor from a location that overlaps a peripheral region of the rotor when the machine is observed on an axis of rotation of the rotor.

27. A machine according to claim 26, for n-phase AC, the machine having n detectors mounted on consecutive teeth close to an opening in a case of the machine.

28. A machine according to claim 26, wherein the at least one detector is fixed to the stator so as to extend along a radial axis of a tooth.

29. A machine according to claim 26, wherein the at least one detector further comprises a temperature sensor.

30. A machine according to claim 1, wherein the rotor has at least one cheek-plate of non-magnetic material, with a radially outer edge of said cheek-plate being set back from a radially outer edge of the magnets and the pole pieces, so as to leave an annular region in which a magnetic field of the magnets can be read by at least one detector.

31. A machine according to claim 1, having individual coils with connection ends formed by respective flat bundles of wires curved to form respective hook shapes, said connection ends being soldered to locally stripped portions of sheathed electric cables.

32. A machine according to claim 1, wherein the stator comprises an assembly of sectors defining air-gaps intersecting the teeth at half-width.

33. A machine according to claim 32, wherein the sectors have co-operating portions in relief on docking sides.

34. A machine according to claim 1, wherein the stator comprises a magnetic circuit inserted by force into a cylindrical case.

35. A machine according to claim 1, constituting a synchronous motor.

36. A machine according to claim 7, wherein the non-magnetic material is aluminum.

37. A machine according to claim 1, wherein the rotor is outside the stator.

38. A machine according to claim 1, wherein the rotor is inside the stator.

39. A rotary electric machine comprising:
a flux concentrating rotor; and
a stator comprising:
   an annular portion;
   teeth having an end connected to said annular portion, each tooth comprising two non-parallel opposite planar faces; and
   a concentrated winding.

40. A rotary electric machine comprising:
a flax concentrating rotor comprising permanent magnets disposed between non-magnetically interconnected pole pieces; and
a stator comprising:
   a concentrated winding; and
   at least one detector comprising a magnetic field sensor to detect a magnetic field of the magnets of the rotor from a location that overlaps a peripheral region of the rotor when the machine is observed on an axis of rotation of the rotor.

41. A rotary electric machine comprising:
a flax concentrating rotor; and
a stator comprising a concentrated winding, said concentrated winding comprising at least one individual coil comprising a plurality of superposed turns of a substantially flat bundle of insulated wires wound around a winding axis, in such a manner that a cross-section of the bundle has a long dimension that extends substantially perpendicularly to the winding axis.

42. A rotary electric machine comprising:
a flux concentrating rotor comprising permanent magnets disposed between non-magnetically interconnected pole pieces; and
a stator comprising a concentrated winding, said concentrated winding comprising at least one coil defining with a corresponding tooth a gap, a detector for delivering a signal representative of rotation of a the rotor being engaged in said gap.

43. A machine according to claim 39, wherein the rotor comprises permanent magnets and pole pieces disposed between the permanent magnets, the permanent magnets having magnetic poles facing the pole pieces.

44. A machine according to claim 39, wherein the rotor comprises permanent magnets disposed between non-magnetically interconnected pole pieces.

45. A machine according to claim 1, wherein the pole pieces are connected to a central portion of the rotor by complementary shapes.

* * * * *